United States Patent Office.

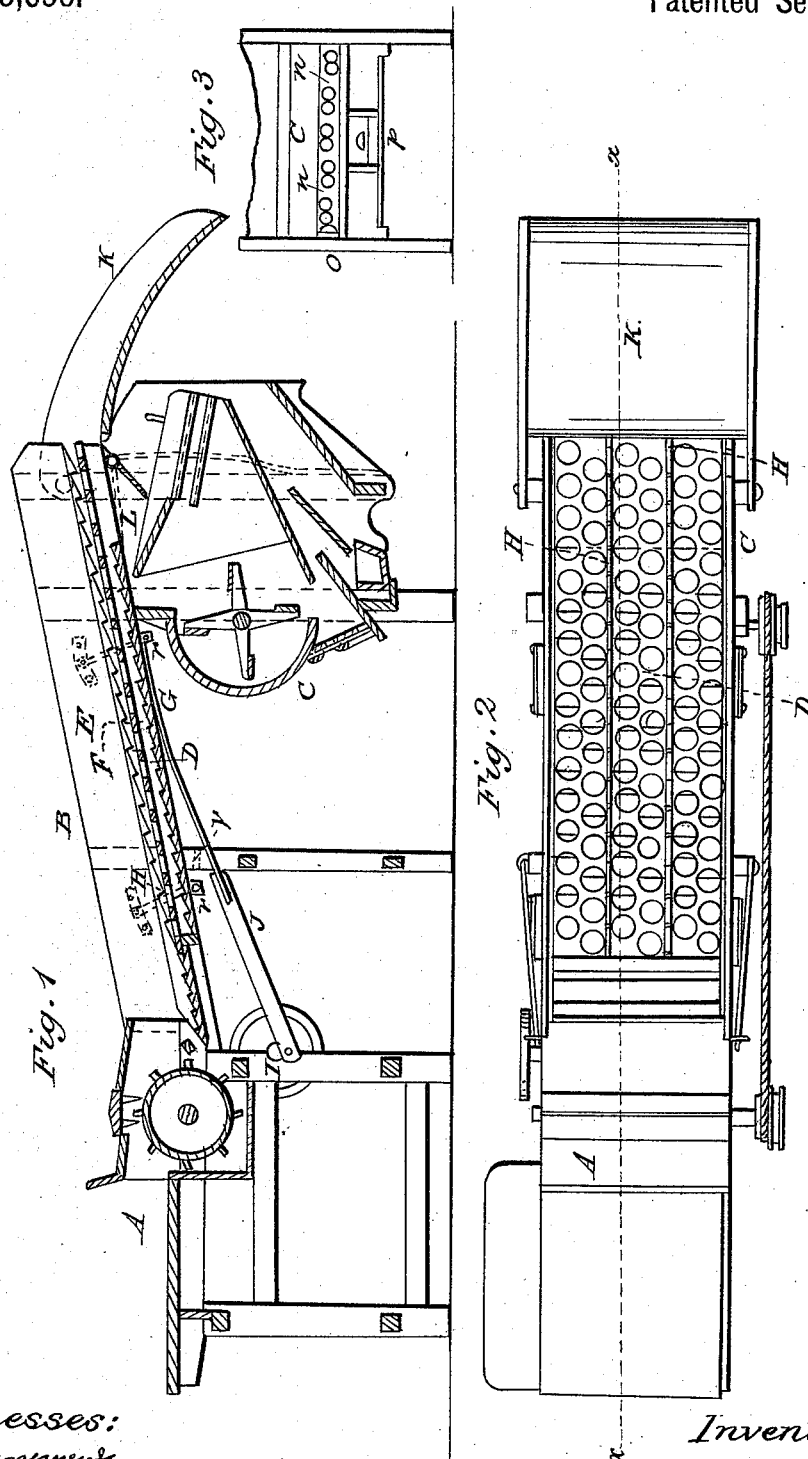

JOSHUA SEIP AND HENRY J. SCHMEYER, OF MACUNGIE, PENNSYLVANIA.

Letters Patent No. 95,050, dated September 21, 1869.

---

IMPROVEMENT IN COMBINED THRESHING-MACHINE AND SEPARATOR.

---

The Schedule referred to in these Letters Patent and making part of the same.

---

*To all whom it may concern:*

Be it known that we, JOSHUA SEIP and HENRY J. SCHMEYER, of Macungie, in the county of Lehigh, and State of Pennsylvania, have invented a new and useful Improvement in Combined Threshing-Machines, Cleaners, and Separators; and we do hereby declare that the following is a full, clear, and exact description thereof, which will enable others skilled in the art to make and use the same, reference being had to the accompanying drawing, forming part of this specification.

This invention relates to new and useful improvements in machines for threshing and cleaning grain, whereby many of the objections to the old style of threshing-machines are obviated; and It consists in the peculiar construction of the separator, or the portion which separates the grain from the straw, but is not confined thereto, but embraces the construction, arrangement, and combination of parts, as will be hereinafter more fully described.

In the accompanying sheet of drawings—

Figure 1 represents a vertical longitudinal section of the machine through the line $x$ $x$ of fig. 2.

Figure 2 is a top or plan view.

Figure 3 is a detached view of the rear end of the fanning-mill.

Similar letters of reference indicate corresponding parts.

A represents the threshing portion of the machine, which does not differ materially from those of ordinary construction.

B is the separating portion, and

C is the fanning-mill for winnowing the grain.

The grain to be threshed is passed through the threshing-machine A, and the straw, chaff, and grain are delivered therefrom on to the separating-floor D.

This floor is enclosed by side-boards E, and consists of two layers or aprons, one above the other, the upper one, F, being perforated with numerous holes for allowing the grain and chaff to pass through on to the apron beneath.

The lower apron G is tight, but corrugated or serrated, angular transverse channels being formed thereon, as represented in fig. 1.

The upper apron F has two (more or less) serrated strips, H, attached to its upper side, as represented.

The perforated apron F, with the strips H and the serrated apron G, are united together and receive a longitudinal motion from the crank I, by means of the connecting-rod J, which is attached to the under side of G, as represented in the drawing.

The rapid longitudinal shaking-motion imparted to the floor D serves to separate the grain from the straw while the motion is such that the straw is carried up by means of the teeth or angles of the serrated strips H, and the grain and the chaff are carried up on the serrated apron G beneath.

The former is carried over from the separating-floor D and delivered on to the apron K in front of the mill.

It will be noticed that the apron G (or lower portion of the separating-floor D) is shorter than the upper portion, so that the grain and the chaff combined with it, is delivered into the hopper L of the fanning-mill, from which it passes on to the sieves and screens of the mill, and the chaff being blown off and the grain cleaned, the grain is delivered at the rear end of the mill, in the usual manner.

As the relative weight varies materially in different kinds of grain, and those of the same kind in different seasons and of different sowings in the same season, the amount of blast in the separator must be graduated correspondingly.

The shaft which rotates the wings of the fan is operated by a belt connected with the mechanism of the threshers, whose requirements must govern the amount of power applied to the machinery. It becomes necessary, then, to possess some other means of regulating the blast. This I accomplish by taking the ordinary driving-power as a maximum, and graduating downward by means of adjustable apertures, which will waste and lessen the blast in different degrees. For instance, with fine plump wheat weighing sixty pounds to the bushel, the slide is closed entirely and the full force of the blast allowed to play upon the grain, chaff, and straw that has passed through the thresher; but when I have rusted wheat, or a different kind of grain, which weighs only fifty pounds to the bushel, I open the sliding door, so as to disclose a sufficient opening to waste and decrease the force of the blast.

The arrangement is plainly seen in fig. 3, where $n$ represents the air-orifices, $o$ the adjustable slide, and $p$ the opening, for the discharge of the cleaned grain.

The separator B and the mill C are connected permanently together, but the separator is connected with the thresher by hooks and staples, so that it can be readily detached therefrom, for transportation, storage, or for other purposes.

The separating-floor D rests on cross-bars, the ends of which are seen at $r$, fig. 1.

These bars are suspended by rods, at each of their ends, from the outside of the side-boards E, so that the floor, or aprons F G, do not slide, but swing, which allows them to receive the required jerking-motion, with a slight application of power.

Having thus described our invention,

We claim as new, and desire to secure by Letters Patent—

1. In combination with a threshing-machine, the separating-floor D, formed of the aprons F and G, with the strips H, constructed, arranged, and operating substantially as herein shown and described, for the purposes set forth.

2. The arrangement of the slide $o$ beneath the cylinder of the cleaner, to regulate the outflow of air and diminish the blast, in the manner specified.

JOSHUA SEIP.
HENRY J. SCHMEYER.

Witnesses:
ISAAC KRIEBEL,
HARRISON MILLER.